United States Patent Office 3,564,803
Patented Feb. 23, 1971

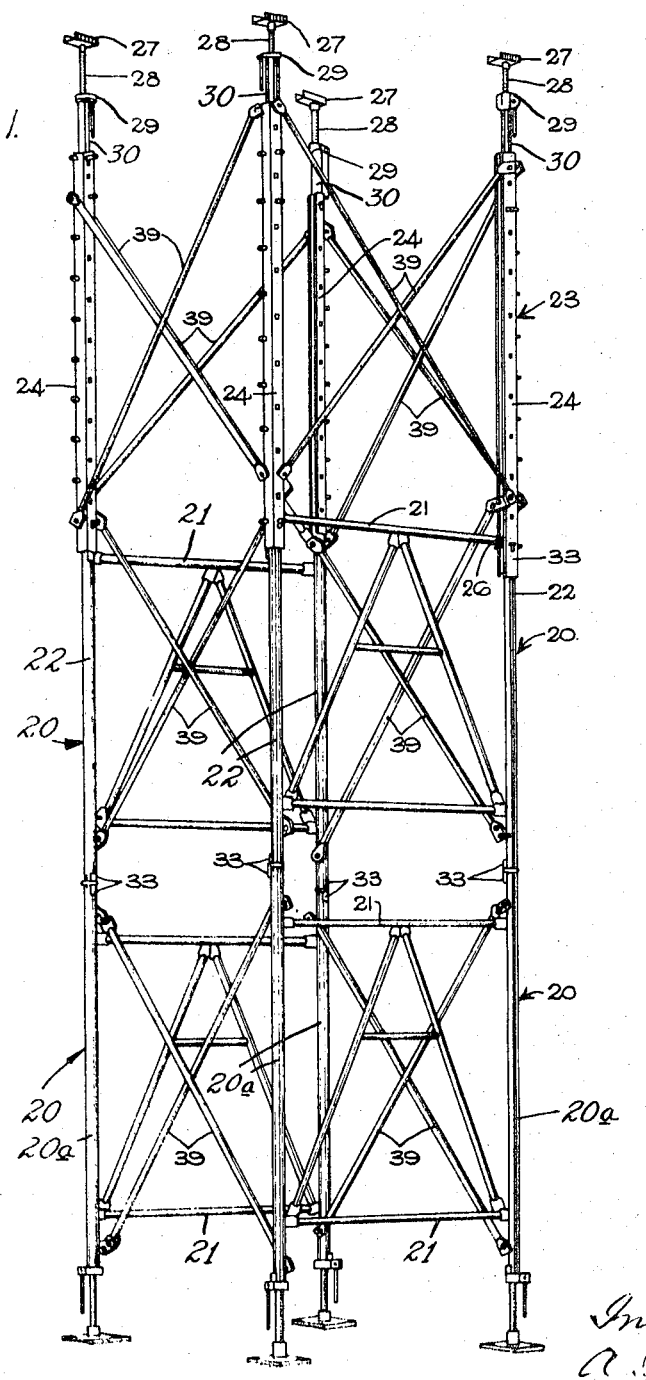

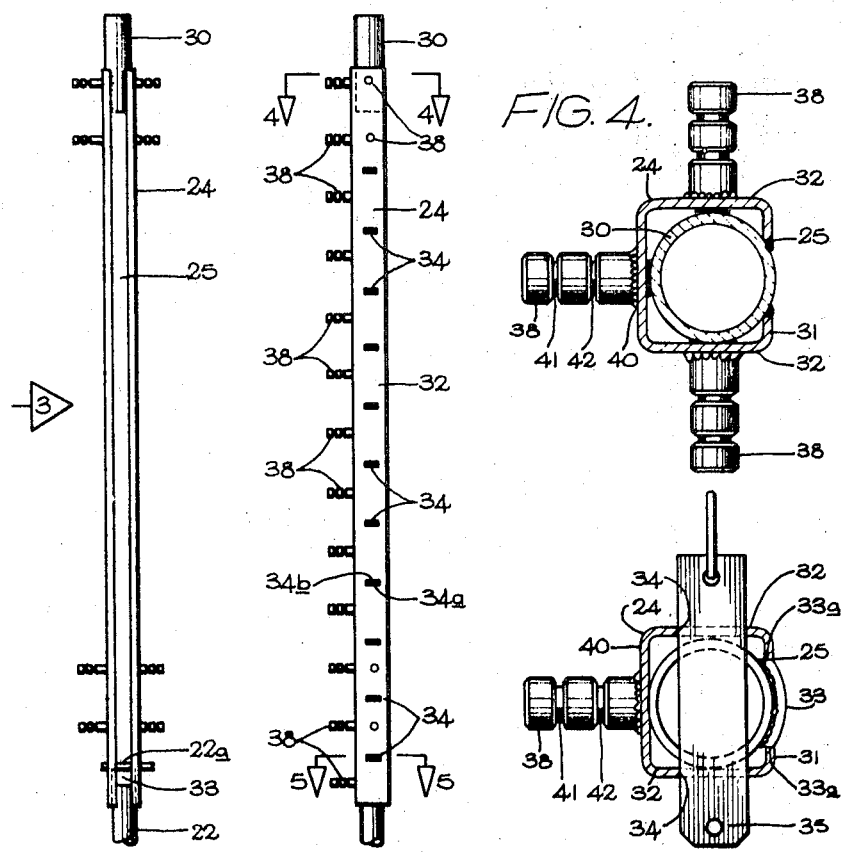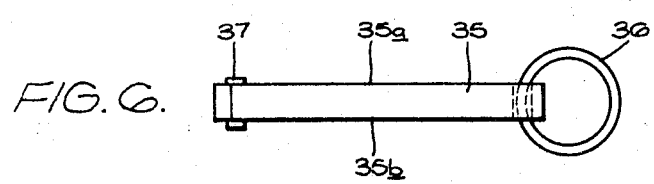

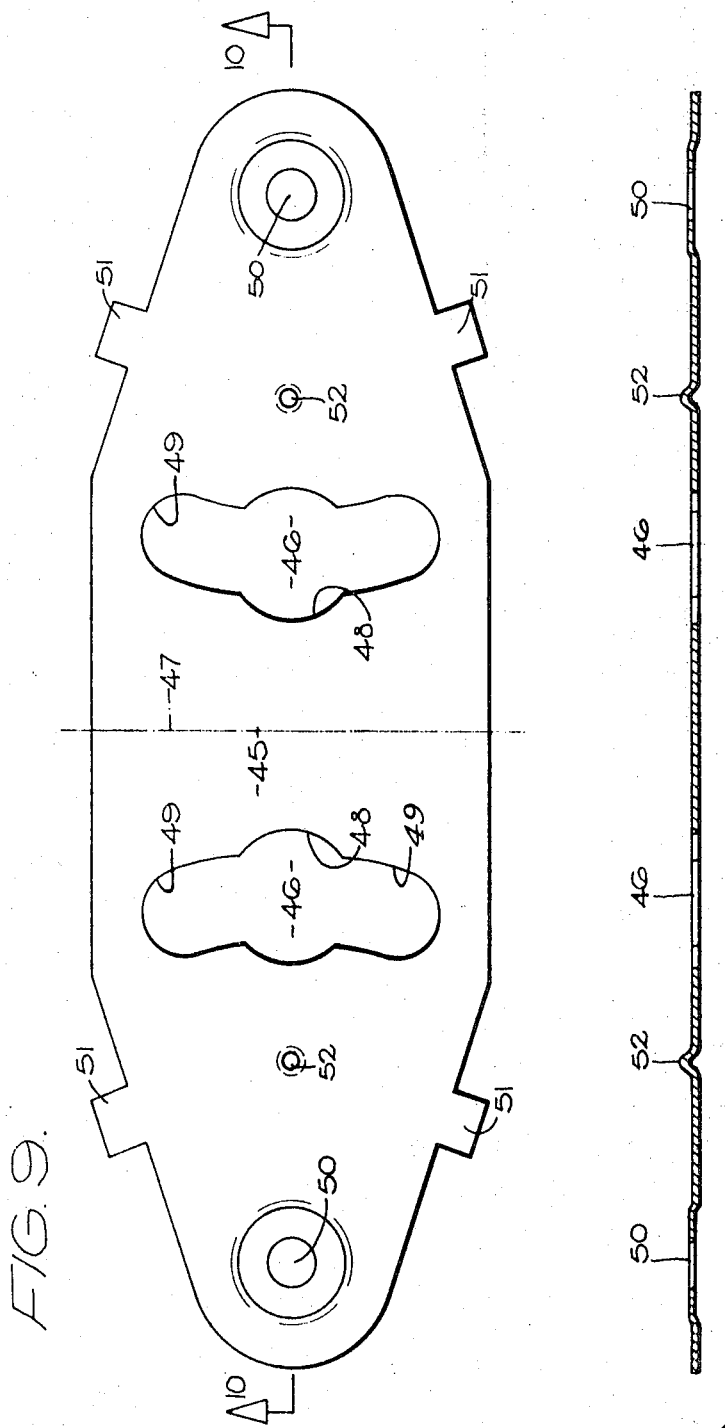

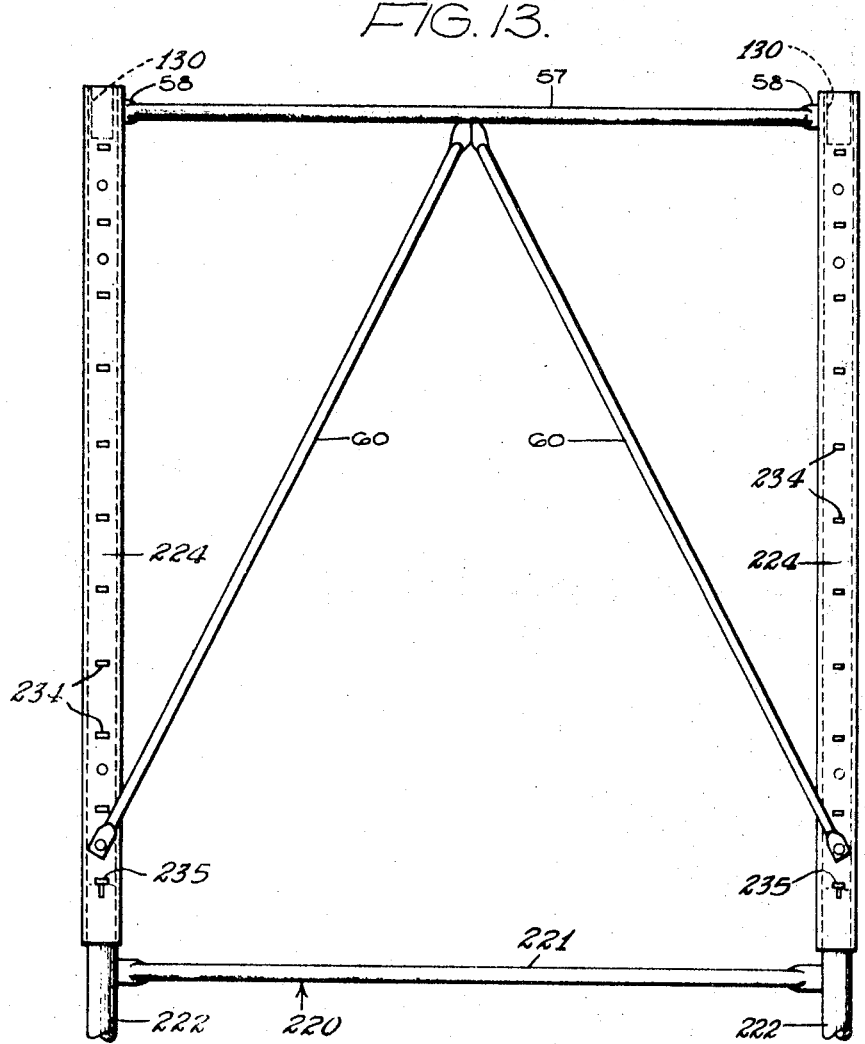
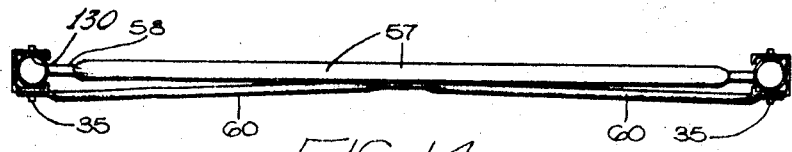

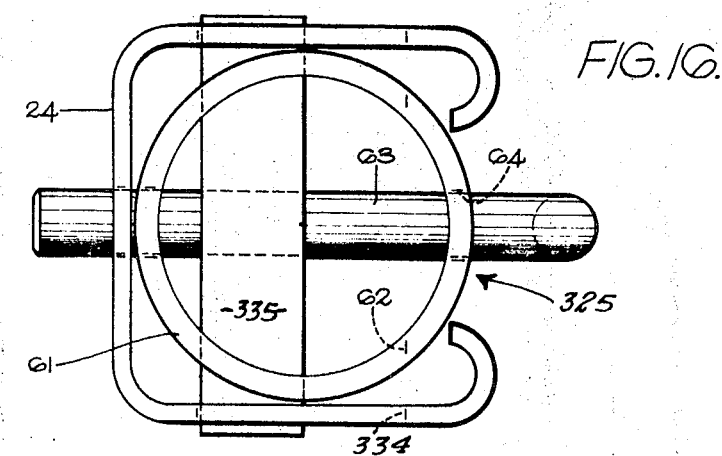
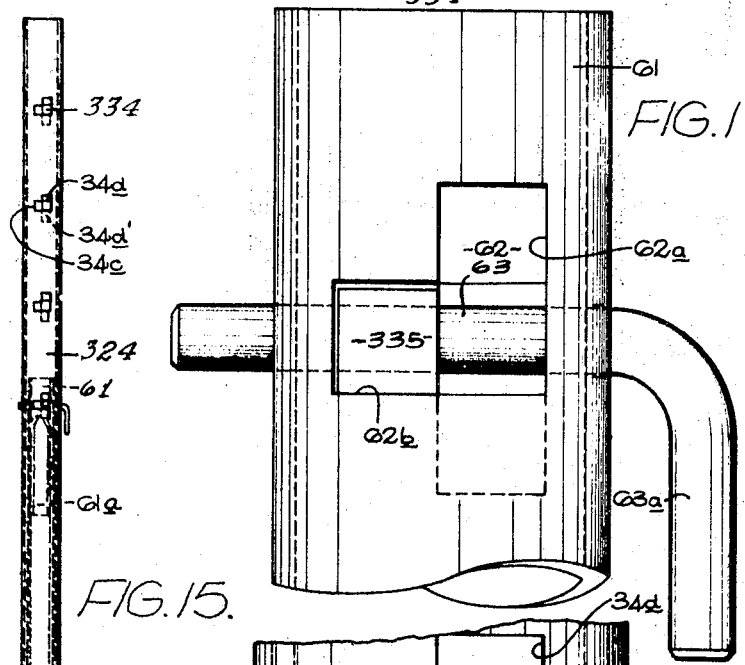
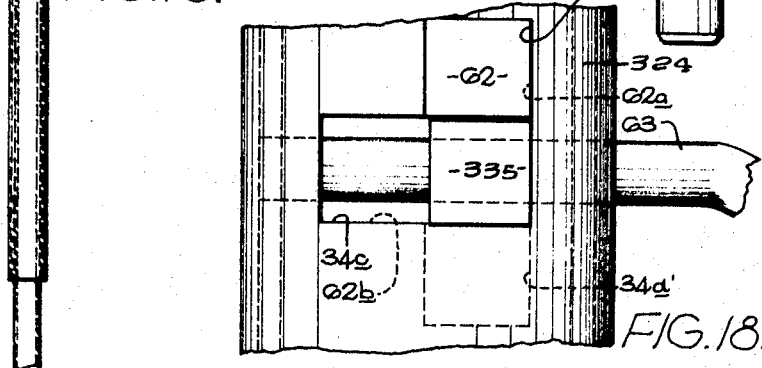

3,564,803
EXTENSIBLE SCAFFOLD AND OTHER LOAD SUPPORTING ELEMENTS
Alan J. Breeze, Epsom, Patrick A. D. Evans, Wheathampstead, Colin Wheelock, Clevedon, and William D. Orwin, Beaconsfield, England, assignors to Mills-Scaffold Company Limited, London, England, a British company
Filed Dec. 6, 1968, Ser. No. 781,785
Claims priority, application Great Britain, Dec. 9, 1967, 56,080/67, 56,081/67, 56,083/67; Mar. 5, 1968, 10,525/68, 10,526/68, 10,528/68; May 31, 1968, 26,105/68
Int. Cl. E04g 1/06, 1/20, 7/24
U.S. Cl. 52—638     7 Claims

ABSTRACT OF THE DISCLOSURE

This invention relates to scaffold and other load supporting elements, which are of telescopic construction, wherein the outer member is formed as a channel, as opposed to a close-sided tube.

(1) Field of the invention

This invention relates to extensible scaffold and other load supporting elements, for example, extensible shores and props and which are of the kind, herein called the kind specified, comprising two elongated members mounted for relative sliding adjusting movement in the direction of their length, one within the other, so as respectively to constitute inner and outer members, with means for securing the two members in their relatively adjusted position, comprising the provision on one of the two members of a series of load transmitting abutments spaced apart along the length of the one member and a displaceable load transmitting element engageable selectively with any one of said abutments on the one member and in load transmitting engagement with a part of the other member.

(2) Description of the prior art

In existing arrangements of extensible load supporting elements of the kind specified, the two members are usually constructed as cylindrical tubes with the inner member arranged to telescope within the outer member, with the inner member being provided with a series of holes spaced apart along the length thereof, the edges of which holes constitute the load transmitting abutments, the holes being adapted detachably to receive a load transmitting element in the form of a pin which engages also a part on one end of the outer member.

Such an arrangement entails the fundamental disadvantage that the tube forming the inner member, by reason of its lesser external diameter, necessarily possesses a smaller resistance to simple compressive loading, as well as of course, to bending stresses than the larger diameter tube forming the outer member. As a result, the safe loading of the element is determined by the diameter of the inner tube, i.e. by the maximum loading which this smaller diameter tube can carry and as a consequence the outer larger diameter tube is loaded to less than its maximum capacity and is thus utilised in a relatively inefficient manner. The extent of this inefficiency is increased by the weakening of the smaller diameter inner tube by the series of pin receiving holes therein which reduce its maximum safe loading.

The foregoing disadvantage is particularly important where as frequently happens, the outer tube forms one of a number of aligned tubular members of metal scaffolding, for example, the upright tubular members of scaffold frames, each frame comprising two such larger diameter tubular members connected permanently together in mutually parallel spaced apart relationship by suitable cross bracing.

Under these circumstances the major proportion of the tubular members of the scaffolding, e.g., the vertical members, which are subjected principally to pure compressive loading, may not be loaded to their permissible maximum value and this is particularly so where the extensible element is constituted by an inner tube depending from the interior of the lower end of the lowermost of a number of vertically aligned upright tubular members and which inner tube carries a ground engaging base, so as to support the whole of the weight of said aligned tubular members.

The foregoing difficulty could, of course, be avoided by making the inner member as a tube of very much greater wall thickness than the outer tube, or else by forming the inner member as a solid bar, but such an alternative would add materially to the weight and to the cost of the scaffolding structure and in the case where the extension element is provided at the upper end of the structure, would increase the weight of the scaffold structure itself, all of which weight has to be carried from the structure base. Necessarily therefore the external load supporting capacity of the structure would be materially reduced.

The present invention has for its object the provision of an improved arrangement by which the disadvantage of the existing arrangement above described is avoided.

SUMMARY OF THE INVENTION

The present invention comprises a scaffold structure including two scaffold frames each comprising a pair of parallel tubular members permanently interconnected by cross members and located so that the four tubular members are parallel and lie at the corners of a rectangle, four puncheons each telescopically engaged with one of said tubular members, each puncheon having a channel of substantially uniform cross section throughout a major portion of the length thereof, the engaged tubular member being slidable within the whole length of said channel whose cross section is such as to retain the tubular member in the puncheon with said cross members passing through the mouth of said channel, means for securing each puncheon and its engaged tubular member in any one of a number of relative positions and comprising a pin engageable with the puncheon and its engaged tubular member, a plurality of brace attachments rigidly secured to, and spaced apart along, the length of each puncheon, said brace attachments projecting outwardly from the part of the puncheon which forms the base of said channel opposite to the mouth, and braces releasably secured to said brace attachments and extending along two opposite parallel sides of said rectangle to connect together in pairs the puncheons at the ends of said sides.

A very important application of this invention is a scaffolding structure comprising: two substantially rigid booms, each boom comprising a three-dimensional framework consisting of a plurality of first mutually parallel members and a plurality of second and bracing members connected between adjacent first members to points adjacent each end of each first member and lying in two sets of mutually perpendicular planes; and a plurality of mutually parallel struts extending between the booms, the struts and the first members of both booms being parallel, the first members of one of the booms receiving the struts for telescopic movement therein and having a cross-sectional shape such that over the whole range of relative telescopic movement of each first member and a strut received therein the whole length of the strut telescoped within the first member is constrained within the first member; means for securing each first member and its telescopically engaged strut in any one of a number of relative positions and comprising a pin engageable in any one of a number of spaced apertures to engage the first member and the strut and hold them in one of said positions; the first members having external brace attachments to which are releasably connected at least the bracing members lying in one of said sets of planes, each such bracing member extending diagonally between said points adjacent opposite ends of adjacent first members, the second members of said one boom lying clear of the struts thus to allow the first boom to be moved as a whole and without dismantling towards and away from the second boom.

Such important application of this invention provides the following advantages:

(i) The upper and lower booms which would conveniently be constituted by interconnected scaffold frames, can be relatively adjusted in a vertical sense without disturbing the construction of the booms, thus by merely adjusting the struts and said first members the upper boom may be lowered by a desired amount so as to permit of the overall reduction in height of the scaffold structure and movement of the structure to another place of use, without having to disassemble the structure.

(ii) The height adjustment is obtained by vertical members extending between the upper and lower booms, as opposed to being provided by vertical members being adjusted below the underside of the bottom boom and above the upperside of the top boom, with their respective free ends unsupporting against relative lateral movement, as is commonly the case in scaffolding constructions as hitherto provided. On the contrary, with the present invention, insofar as the height adjustment is provided by members extending between the two booms, which members are necessarily supported at their lower end by the top portion of the lower boom, and at their upper end by the bottom portion of the top boom, the struts are effectively supported against buckling under the vertical loading, and with this form of scaffolding structure greater loads can be applied.

With the invention as so far described it may be difficult in practice to prevent some torque loading being applied to the puncheon and tending to rotate the outer member or puncheon about the longitudinal axis of the inner member, e.g. about the tubular upright members of the aforementioned scaffold frame, the effect of this rotational torque loading being to distort or buckle the channel-like outer members with the result that their resistance to compressive loading is undesirably reduced. Indeed, it has been found that the torque loading applied may be such in the case of a rectangular channel outer member as to cause the channel sides to distort relative to the channel web through an angle as great as 45°.

A further important feature of this invention is directed to the avoidance of the foregoing difficulty and comprises providing the end of the inner member over which the channel-like outer member slides with a restraining member secured against rotational movement about the longitudinal axis of the inner member, the restraining member being adapted to engage with the outer member for all adjusted positions thereof along the inner member in such a manner as positively to restrain the outer member from turning relative to the inner member.

For instance, each restraining member may comprise a projection on the exterior of the inner member engaging between the edges of the open side of the channel-like outer member.

BRIEF DESCRIPTION OF THE DRAWINGS

The invention is illustrated in the accompanying drawings, wherein:

FIG. 1 is a side view in perspective of a scaffolding structure in accordance with this invention.

FIG. 2 is a side elevation to an enlarged scale of the outer member of one of the load supporting elements depicted in FIG. 1 and showing its mode of connection to the inner member of the supporting element.

FIG. 3 is a further elevational view of the same outer member looking in the direction of the arrow 3 in FIG. 2.

FIGS. 4 and 5 are sectional plan views to an enlarged scale on the lines 4—4 and 5—5 respectively of FIG. 2.

FIG. 6 is a side elevation to an enlarged scale of the load transmitting element of the supporting elements depicted in FIG. 1.

FIG. 9 is a plan view showing the configuration of the length of metal strip from which is formed part of the construction depicted in FIGS. 7 and 8.

FIG. 10 is a sectional view on the line 10—10 of FIG. 9.

FIG. 13 is a side elevation of a further form of extensible load supporting element in accordance with this invention.

FIG. 14 is a plan view of the element depicted in FIG. 13.

FIG. 15 is a side elevation of a still further form of extensible load supporting element in accordance with this invention and illustrating an alternative arrangement for securing the two members of the element in their relatively adjusted position.

FIG. 16 is a plan view to an enlarged scale of the construction shown in FIG. 15.

FIGS. 17, 18 and 19 are detail views of part of the construction shown in FIGS. 15 and 16.

DESCRIPTION OF THE PREFERRED EMBODIMENT

Figure 7:
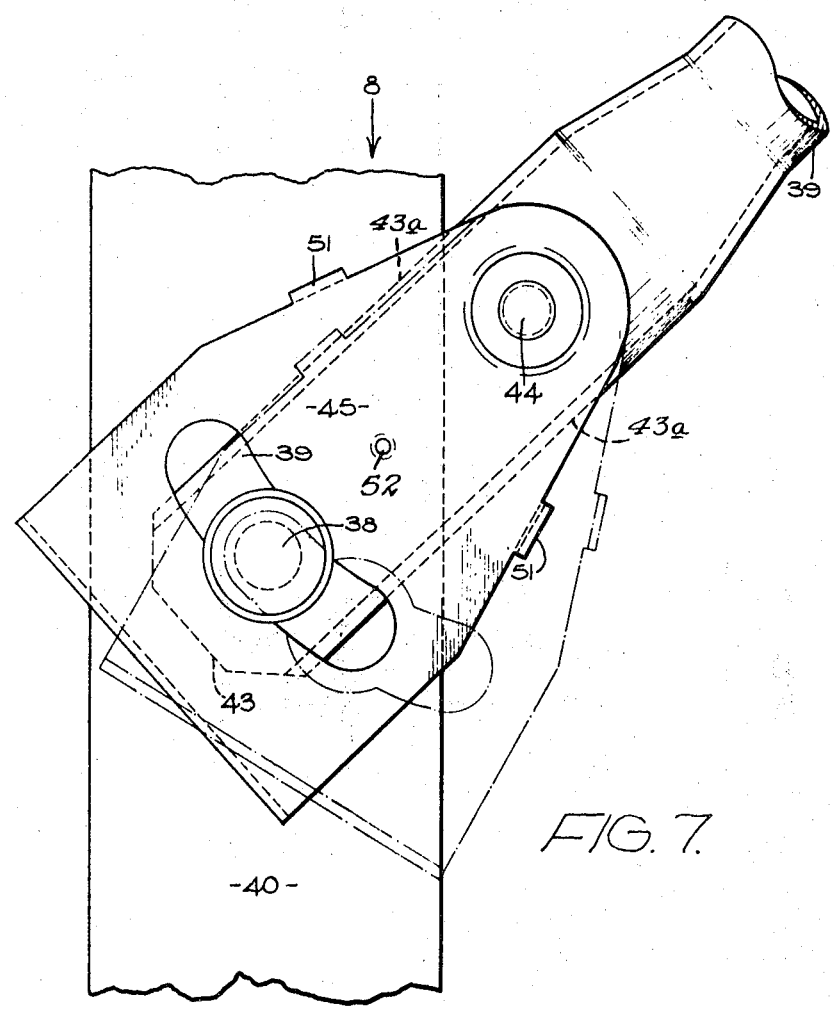
FIG. 7 is a side elevation to an enlarged scale of part of the construction depicted in FIG. 2 showing one arrangement for releasably connecting a bracing element to the outer member of one of the extensible load supporting elements.
Figure 8:
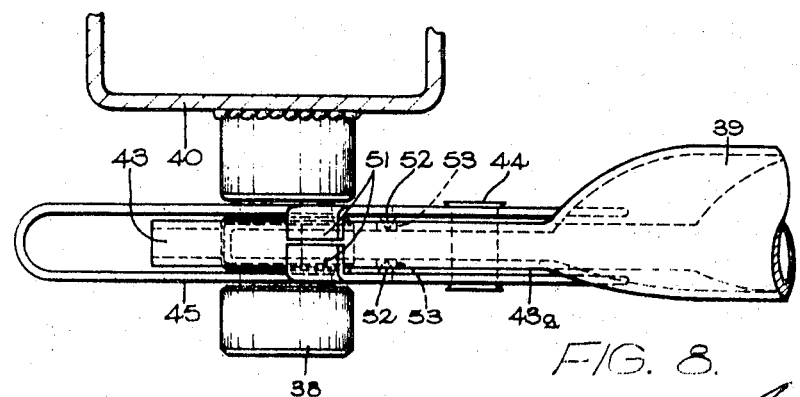
FIG. 8 is a view looking in the direction of the arrow 8 in FIG. 7.

Referring firstly to FIG. 1 of the drawings there is there depicted a scaffolding structure in the form of a tower scaffold of generally rectangular configuration and built up from a number of scaffold frames 20 each comprising a plurality of cross members 21 which connected permanently together in horizontal spaced relationship a pair of vertical tubes of plain cylindrical form which in the case of the uppermost of the frames depicted in FIG. 1 each constitute the inner member 22 of extensible load supporting elements 23 provided at the upper part of the tower scaffold adjacent each of the four corners thereof.

The outer member 24 or puncheon of each extensible elements 23 is as shown more clearly in FIGS. 2 to 5 of square channel-like shape so as to be open on one side 25. The channel-like outer member 24 is of internal dimensions sufficiently larger than that of each tube forming the inner member 22 as to be freely vertically slidable thereover, with the difference in dimension being sufficient merely to provide working clearance between the two members 22, 24 so as to avoid undesirable relative lateral movement.

The two outer members 24 which are mounted on each pair of inner members 22 which form the two uprights of their associated scaffold frame 20 are disposed with the open sides of the two channels constituting the outer members 24 facing towards one another and these open sides have a width sufficiently large as to clear the end portions 26 of the cross members 21 which extend between the two upright members 22 of the scaffold frame 20, which end portions 26 are flattened in the known manner with their major axis of cross section vertical to facilitate the vertical sliding of each outer member 24 along the length of the associated inner member 22.

The two outer members 24 carried on each scaffold frame 20 are adjustable independently of one another along the length of their associated inner member 22 so as to permit of the upper ends of the several outer member 24 being adjusted to different heights for supporting through U-shaped brackets 27, beams and/or which may extend at an inclination to the horizontal.

Such a feature of independent adjustment also permits, in the case where the outer members 24 are provided on the lower ends of the inner members 22, of the outer members supporting the scaffolding structure in a horizontal position from irregular or sloping ground.

The U-shaped brackets 27 are carried on bars 28 having a screw thread adjustable connection to nuts 29 which are received detachably within sleeve-like sockets 30 which are welded within the upper end of each outer member 24.

In the case where the outer members 24 are disposed at the base of the scaffold structure, these sockets 30 would similarly be provided at the lower ends of the members 24 for receiving the upper ends of short bars or the equivalent, provided on ground engaging bases; there being provision if desired, of means for threadably adjusting the position of each base in a vertical direction in relation to the associated extension member to take care of small differences in ground slope or ground irregularities.

As shown in FIG. 4, the free edge 31 of each lateral side 32 of each channel-like member 24, is beaded inwardly both to compensate for the loss of section consequent on the open side 25 of each member 24, as well as to stiffen each channel edge and further to trap each inner member 22 within the outer member 24 throughout the whole length of the outer member.

If desired, each channel-like member 24 may be beaded outwardly at each edge 31 and instead of providing a rectangular channel, each member 24 may be constructed as an open-sided tube with the width of the opening being substantially the same as that of each open side 25 as illustrated in FIG. 4, but with the edges of the open-side of the tube beaded outwardly away from one another for the purpose earlier described. Such open-sided tube forming the outer member 24 would apart from its open side, be of cylindrical configuration of bore slightly greater than the external diameter of the tube forming each inner member 22, so as to be a free sliding fit thereon.

Each end of each inner member 22 forming the two upright tubes of each scaffold frame 20 is provided at the opposed sides of the two upright tubes with a restraining member 33 in the form of a metal plate of rectangular shape bent to part-circular configuration and secured as by welding at the position referred to to the exterior of the tube forming each inner member 22, with one pair of opposite edges 33a of each plate-like restraining member 33 extending parallel to the length of the member 22.

Each restraining member 33 has a width slightly less than the width of the open side 25 of each channel-like outer member 24, so that the one pair of opposite edges 33a thereof extending parallel to the length of the member 22 are adapted to engage between the beaded edges 31 of the outer member 24, thus for the reason earlier explained positively restraining the outer members 24 from turning relative to the associated inner member 22 in all adjusted positions of each outer member, while permitting of such adjustment being effected.

The restraining members 33 are provided at both ends of the inner members 22 to provide for an outer member 24 being mounted on either end of each member 22.

The lateral sides 32 of the channel-like outer members 24 are provided with a series of load transmitting abutments in the form of pairs of holes 34 of rectangular form having their major axis of cross section perpendicular to the length of each member 24, the two holes in each pair being in register with one another and being adapted detachably to receive a load transmitting element in the form of a load pin 35, see FIG. 6, which is retained in position by providing the pin at one end with a retaining head 36 of loop-like form, which serves as a handle and at the opposite end with a retaining peg 37. As shown in FIG. 6, both the head 36 and the peg 37 extend in a vertical direction above and below the upper and lower in situ horizontally extending faces 35a, 35b, respectively of the load pin 35.

Both the thickness of each pin 35 as measured between its upper and lower faces 35a, 35b and the length of each peg 37 is less than the width of each hole 34 as measured between its upper and lower edges 34a and 34b. The overall dimension in such direction of the pin head 36 is however greater than the width of each hole 34.

In use, each outer member 24 is adjusted to the desired longitudinal position in relation to the associated inner member 22 and the load pin 35 is inserted peg end first through the pairs of holes 34 which are nearest to but beyond the adjacent extremity 22a of the inner member 22 so as to be adapted to engage with such particular part of the inner member.

When each load pin 35 is so positioned and the upper end of each outer member 24 as depicted in FIG. 1 is supporting through U-shaped bracket 27 the load to be carried, the upper and lower faces 35a, 35b of the pin will be in load transmitting engagement respectively with the load transmitting abutments constituted by upper hole edges 34a and with the adjacent end 22a of inner member 22. Thus each pin 35 will be retained by the applied load in a position in which the upper side of retaining peg 37 overlaps with the upper edge 34a of the adjacent hole 34 at the outer side thereof, thus positively locking the pin 35 against withdrawal while under load.

Each outer member 24 is provided with a number of laterally projecting cylindrical studs 38 or brace attachments adapted to engage with the ends of braces or bracing elements 39 by which adjacent outer members 24 can be braced together when in their adjusted position. These studs 38 are secured as by welding to the outer face of the two lateral sides 32 of each channel-like outer member adjacent each end thereof and also to the outer face of the web 40 of the outer member at positions spaced apart along the length of the web by the same distance as the spacing between the holes 34. Each stud is formed intermediate its two ends with a pair of peripheral annular grooves 41, 42 respectively disposed nearer to the face end and inner end of the stud.

Returning now to FIGS. 7 to 10 of the drawings, each bracing element 39 is formed as a tube opposite ends 43 of which are flattened. Each flattened end 43 has pivoted thereto on transversely extending pivot pin 44 a locking member 45.

Such locking member is formed by taking a length of metal strip of the configuration and having the pair of apertures 46 depicted in FIG. 9. Such strip is then bent about line 47 to the configuration shown in FIGS. 7 and 8 to bring the two apertures 46 into register with one another, each aperture providing a hole 48 of diameter slightly larger than that of the stud 38 and two arcuate slots 49 of width less than the diameter of the stud but slightly greater than that of the stud grooves 41, 42 so that the edges of one or the other of two arcuate slots 49 associated with each hole 48 engage in each of the two grooves 41, 42 according to which side of the bracing element end 43 is presented to the free end of the stud and the engagement of the slot edges 49 with the stud grooves, serves to keep these free from dirt, particles of concrete and other extraneous matter.

Each strip forming the locking member 45 is formed at positions along its edges which before bending (see FIG. 9) are intermediate the arcuate slots 49 and the hole 50 for pivot pin 44, with a pair of stop lugs 51, these lugs prior to assembly of the parts are bent out of the plane of the strip depicted in FIGS. 9 and 10.

Also at positions between each pivot hole 50 and the central grooved stud receiving hole 48, the strip is formed with a retaining protuberance in the form of a dimple 52 of configuration most clearly shown in FIG. 10.

The flattened ends 43 of each bracing element 39 is formed medially of the width thereof intermediate the stud hole 48 and the pivot pin 44 with a pair of holes or recesses 53 each adapted to register with and receive one of the dimples 52 when the formed locking member 45 is mounted on the end of the bracing element 39 and is in its intermediate position.

Thus, with the locking member 45 in its full line intermediate position shown in FIG. 7, each of the dimples 52 is in register with and engages resiliently within the mouth of the corresponding recess 53 to retain the locking member resiliently and releasably in the intermediate position.

When the locking member 45 is displaced into either of its two locking positions, one of which is illustrated by the chain line position in FIG. 7, the pair of dimples 52 engage with the adjacent edge 43a of the flattened end 43 of the bracing element so as to overlap such edge by a small amount and retain the locking member releasably in one or the other of its two locking positions. Movement beyond each of these positions is prevented by the engagement of the pair of oppositely extending stop lugs 51 with the adjacent edge 43a of the bracing element end.

The arrangement may be further such that with the locking member 45 in either of its locking positions, and the associated bracing element in a non-vertical position as illustrated in FIG. 1, the locking member 45 under its own weight is swung automatically about its pivot pin 44 into one or the other of its two locking positions irrespective of which side of the locking member is presented towards the outer member 24. Such automatic displacement of the locking member 45 into its locking position is ensured by the provision of the two arcuate slots 49 on each side of the central hole 48 as well as by the provision of two grooves 41, 42 on each stud.

If desired one of the two arcuate slots 49 may have the same width as the diameter of each hole 48, i.e. of a width greater than the outside diameter of each stud so that only one or the other of the two ends of one slot engages within one of the stud grooves when the locking member 45 is in one or the other of its two operative positions.

Although the outer members 24 are adjustable independently of each other they may be adjusted simultaneously. Thus the four outer members 24 wtih the bracing element between them constitute a first boom having parallel first members, the members 24 and a plurality of second members, the bracing elements 39, lying in two sets of mutually perpendicular planes so as to form a three dimensional framework with the first members. The lowermost part of the tower comprises a second boom having four vertical first members constituted by the vertical tubes 20a of the lowermost pair of frames 20, the first members being interconnected by second members, i.e. the transverse members 21 and the bracing elements 39, lying in two sets of mutually perpendicular planes to form a three dimensional framework.

The inner members 22 constituted by the vertical tubes of the uppermost pair of scaffold frames 20 constitute struts between the first and second booms and these struts are telescopically engaged with the first members, i.e. the outer members 24 of the first boom which can be slid down the struts 22 towards the second boom by appropriate manipulation of the load pins 35 associated with the members 24.

Figure 11:
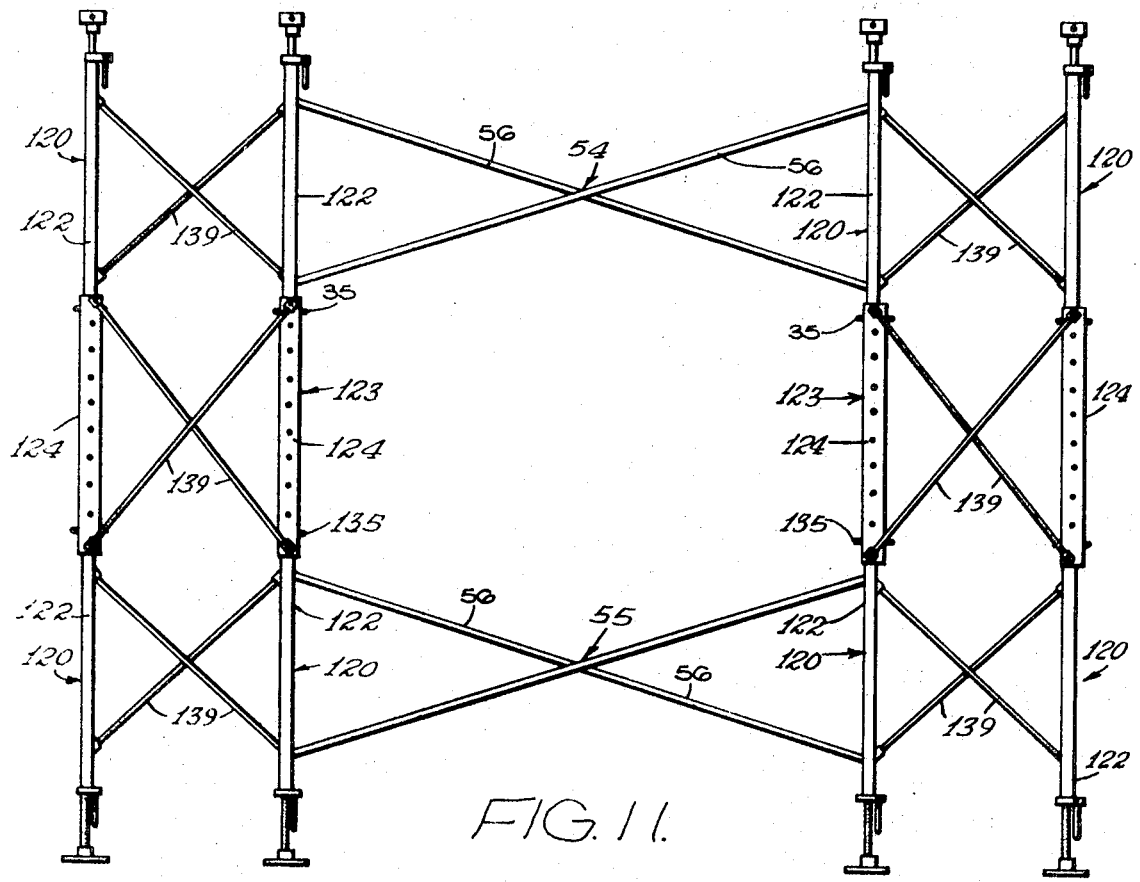
FIG. 11 is a side elevation of a further form of scaffolding structure embodying extensible load supporting elements of the particular construction depicted in FIGS. 2 to 10.
Figure 12:
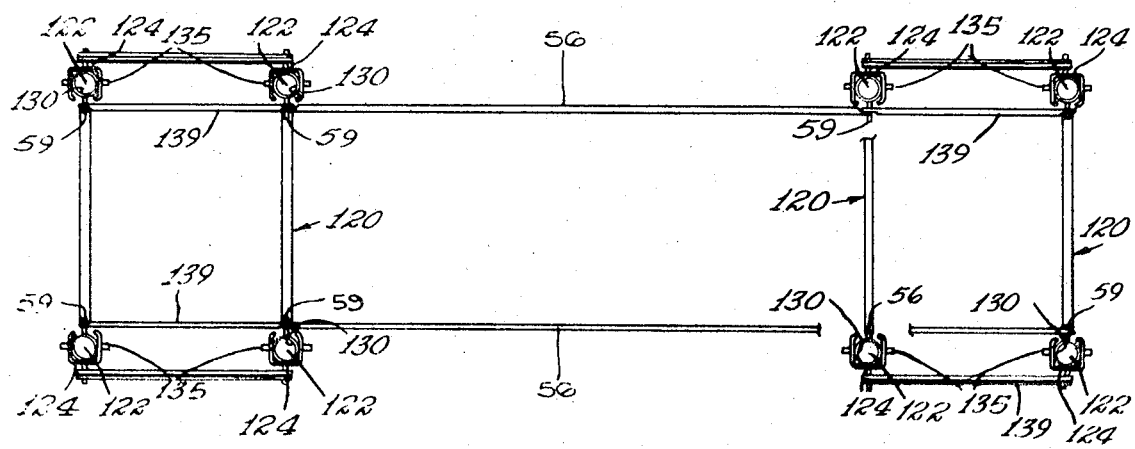
FIG. 12 is a plan view of the construction shown in FIG. 11.

In FIGS. 11 and 12 are depicted a further form of scaffolding structure embodying this invention comprising upper and lower horizontally extending booms 54, 55 connected together at their two ends in adjustable vertically spaced relationship by extensible load supporting elements 123 and constructed as already described with reference to the elements 23 in FIGS. 2 to 6 of the drawings.

Each boom 54, 55, is built up from a number of scaffold frames 120 of the form depicted at 20 in FIG. 1 the upright tubes 22 of which are connected together in horizontally spaced parallel relationship by bracing tubes 56 and bracing elements 139, so that each frame 120 is disposed in a vertical plane with the pairs of upright tubes 122 of the frames of the upper boom aligned with the uprights 122 of the frames of the lower boom. The ends of the bracing tubes 56 and bracing elements 139, are connected as already described to grooved studs 59 similar to the studs 49 but provided on the tubes 122 and extending through the open side of each channel member 124 (see FIG. 12).

The lower end of each upright 122 at each end portion of the upper boom 54 is connected adjustably to the upper end of the correspondingly vertically aligned upright 122 at the same end of the lower boom, the connection in each case being through one of the channel-like outer members 124, the upper and lower end of each of which member would have adjustably connected thereto a load pin 135 similar to the pin 35 and in load transmitting engagement with the lower end of the upper boom uprights and the upper ends of the lower boom uprights respectively.

Insofar as opposite ends of each channel-like outer member 124 are connected to upright tubes 122 constituting the inner members of the so formed extensible load supporting elements, which tubes 122 are rigid with their respective booms there is little likelihood of the outer members 124 buckling or bending laterally under the external loading applied to the upper boom so that the construction provides a particularly rigid vertically adjustable connection between the two booms.

With the above described arrangement by inserting either one of or both of the two load pins 135 in different pairs of holes in each channel-like outer member 124, the vertical spacing between the two booms can be varied as desired.

Referring now to FIGS. 13 and 14 of the drawings there is here depicted a further form of extensible load supporting element in accordance with this invention, in which the two channel-like outer members 224 on the pair of upright tubes 222 of each scaffold frame 220 are connected permanently together by an upper horizontal tubular cross member 57, the opposite ends 58 of which are flattened and welded to sockets 130 (similar to the sockets 30) disposed within the upper ends of the channel-like outer members 224 and welded thereto, each of which sockets 130 has the same external diameter as that of the scaffold frame upright tubes 222.

The arrangement is such that with the two channel-like outer members 224 so connected, the open sides of the two channel-like members face towards one another in manner similar to the arrangement shown in FIG. 1.

Additional bracing 60 is provided between the centre of each cross member 57 and the lower end of each channel-like outer member 224; such bracing 60 being of tubular form but having its two ends flattened and welded to the members 224 and 57, the welding being to one side of the cross member 57 and to the corresponding side of the member 224 so that as will be apparent from FIG. 14, each of these bracings 60 can be slidden past one side of the adjacent transverse member 221 of the associated scaffold frame 220.

With the construction shown in FIGS. 13 and 14 each outer member 224 is secured adjustably to the corresponding inner member 222 formed by one of the upright tubes of the frames 220 by load pins 235 engaging adjustably in pairs of holes 234 in the member 224 in the manner already described with reference to the construction shown in FIGS. 1 to 6.

In FIGS. 15 to 19 there is depicted a further form of securing means for securing the two members 322, 324, of each extensible load supporting element in their desired relatively adjusted positions. In this further arrangement, one end, as shown, the upper end of the inner member 322 and which extends within the outer member 324 supports a load pin carrying sleeve 61 of the same inside and outside diameter as that of the tube forming the inner member 322. One end of the sleeve 61 is provided with a spigot 61a which extends within the end of the inner member 322 which abuts the adjacent end of sleeve 61.

The sleeve 61 is formed on each of two horizontally opposite sides thereof with a T-shaped hole 62, with the major dimension of the head portion 62a of the hole extending along the length of the sleeve and with the stem portion 62b of the T-shaped hole extending perpendicular to such length.

A load pin 335 extends diametrically between the two T-shaped holes 62 in the sleeve 61.

The load pin 335 medially of its length is mounted on a spindle 63 which is both axially slidable and turnable within a pair of holes 64, provided in the sleeve 61, the spindle having an operating portion 63a, which projects through the open side 325 of the channel-like outer member 324 when this is in situ.

Figure 19:
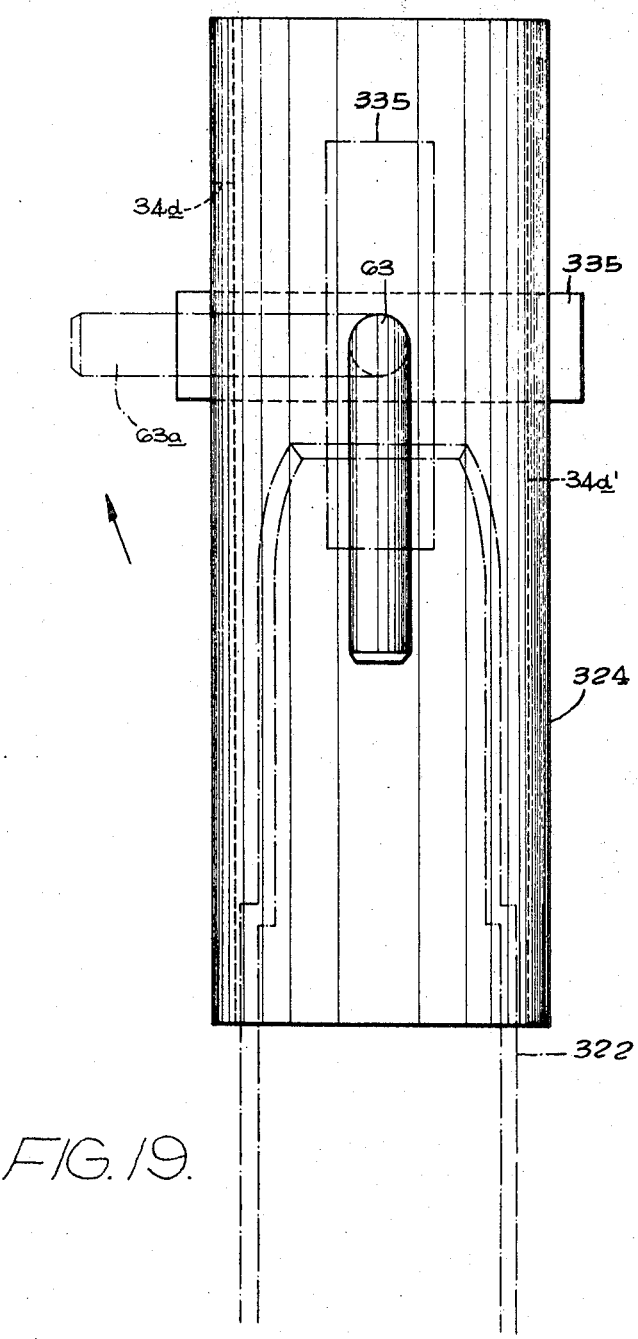

The load pin 335 is of square section and in one position of the parts, constituting a load transmitting position, as shown in FIGS. 16 and 17, the pin 335 is in register with each hole portion 62b, the arrangement being such that the spindle 63 can be displaced axially in a righthand direction in FIGS. 16 and 17 to bring the load pin 335 in register with the wider hole portions 62a, whereupon the spindle 63 can be turned through 90° in the direction of the arrow in FIG. 19, so that the load pin 335 is now in an inoperative position in which it extends in a direction axially of the sleeve 61.

The pairs of holes 334 in the sides of each channel-like outer member 324 are in this arrangement of angle shape, with one part 34c of each hole slot extending perpendicularly to the length of the associated member 24 and the other part 34d of each hole 334 extending along the length of member 324 but in opposite directions at its two sides. Thus at one side the part 34d of each hole 334 extends in an upward direction in FIG. 18, as shown at 34d in FIG. 18 and downwardly in FIG. 18 at the opposite side as indicated at 34d'.

The arrangement is such that by appropriately adjusting the outer member 324 along the length of the inner member 322 each load pin 335 can when in its operative position, as depicted in FIGS. 16 and 17 within hole portion 62b, also extend within the portion 34c of each hole 334 so as then to secure the outer member in the desired axially adjusted position.

The dimensions of each hole 334 are such that with the parts in the position last described, the spindle 63 can then be slidden in a righthand direction in FIGS. 9 and 10 to withdraw the load pin 335 from the hole portions 62b and 34c, whereupon spindle 63 and load pin 335 can be swung in the direction of the arrows of FIG. 19 into the free position, such movement being permitted by the aforementioned disposition of the portions 34d, 34d' at each hole 334 and serving to disengage the pin 335 from the holes 334 in the outer member 24 and permitting of this being adjusted along the length of the inner member 322 and when desired separated entirely from the member 322.

As will be apparent from FIGS. 16 and 17, the load pin 335 is captive in relation to the associated extensible element 321 considering the parts assembled together by being captive in relation to both the outer member 324 and the sleeve 61. Thus the latter with the load pin 335 and outer member 324 form a self contained unit adapted for detachable mounting on an existing inner member 322 such as one of the upright tubes of an existing scaffold frame.

Such unitary construction is also a feature of the form of outer members depicted in FIGS. 1 to 6 insofar as this is provided with the load pin shown in FIG. 6.

We claim:

1. A scaffolding structure including two scaffold frames each comprising a pair of parallel tubular members permanently interconnected by cross members and located so that the four tubular members are parallel and lie at the corners of a rectangle, four puncheons each telescopically engaged with one of said tubular members, each puncheon having a channel of substantially uniform cross section throughout a major portion of the length thereof, the engaged tubular member being slidable within the whole length of said channel whose cross section is such as to retain the tubular member in the puncheon with said cross members passing through the mouth of said channel, means for securing each puncheon and its engaged tubular member in any one of a number of relative positions and comprising a pin engageable with the puncheon and its engaged tubular member, a plurality of brace attachments rigidly secured to, and spaced apart along, the length of each puncheon, said brace attachments projecting outwardly from the part of the puncheon which forms the base of said channel opposite to the mouth, and braces releasably secured to said brace attachments and extending along two opposite parallel sides of said rectangle to connect together in pairs the puncheons at the ends of said sides.

2. A scaffolding structure according to claim 1 wherein each tubular member is provided with a restraining element fixed thereto and which engages the puncheon in which the tubular member is engaged in all of said relative positions to prevent relative rotation between the tubular member and the puncheon.

3. A scaffolding structure according to claim 2 wherein the restraining element is a projection on the tubular member engaging in the mouth of the channel.

4. A scaffolding structure according to claim 1 wherein the securing means for each puncheon and its engaged tubular member comprises pairs of aligned pin-receiving apertures formed in the wall of the channel between the base and the mouth thereof and spaced apart along said part of the puncheon.

5. A scaffolding structure according to claim 4 wherein each pin engages an end of a tubular member.

6. A scaffolding structure according to claim 4 wherein each aperture and each pin has complementary flat surfaces which are forced into engagement when the structure is under load, each pin having a projection at one end and a grasping head at the other end, the projection extending perpendicular to said flat face and being located to prevent the pin being withdrawn from the apertures in which it is received while said flat surfaces are in engagement.

7. A scaffolding structure comprising: two substantially rigid booms, each boom comprising a three-dimensional framework consisting of a plurality of first mutually parallel members and a plurality of second and bracing members connected between adjacent first members to points adjacent each end of each first member and lying in two sets of mutually perpendicular planes; and a plurality of mutually parallel struts extending between the booms, the struts and the first members of both booms being parallel, the first members of one of the booms receiving the struts for telescopic movement therein and having a cross-sectional shape such that over the whole range of relative telescopic movement of each first member and a strut received therein the whole length of the strut telescoped within the first member is constrained within the first member; means for securing each first member and its telescopically engaged strut in any one of a member of relative positions and comprising a pin engageable in any one of a number of spaced apertures to engage the first member and the strut and hold them in one of said positions; the first members having external brace attachments to which are releasably connected at least the bracing members lying in one of said sets of planes, each such bracing member extending diagonally between said points adjacent opposite ends of adjacent first members, the second members of said one boom lying clear of the struts thus to allow the first boom to be moved as a whole and without dismantling towards and away from the second boom.

References Cited

UNITED STATES PATENTS

| | | | |
|---|---|---|---|
| 2,369,534 | 2/1945 | Cohen | 52—123 |
| 2,569,653 | 10/1951 | Boedecker | 182—178 |
| 2,681,834 | 6/1954 | Benson | 287—53.5 |
| 2,857,026 | 10/1958 | Jones | 52—123 |
| 3,190,405 | 6/1965 | Squire | 52—637 |
| 3,371,458 | 3/1968 | Sturgill | 52—726 |

FOREIGN PATENTS

| | | | |
|---|---|---|---|
| 992,243 | 1965 | Great Britain | 52—640 |
| 1,102,553 | 1968 | Great Britain | 52—123 |

HENRY C. SUTHERLAND, Primary Examiner

U.S. Cl. X.R.

52—650; 182—178

Notice of Adverse Decision in Interference

In Interference No. 98,339 involving Patent No. 3,564,803, A. J. Breeze, A. D. Patrick, C. Wheelock and W. D. Orwin, EXTENSIBLE SCAFFOLD AND OTHER LOAD SUPPORTING ELEMENTS, final judgment adverse to the patentees was rendered May 29, 1974 as to claims 1, 2, 3, 4, 5 and 7.

[*Official Gazette of September 24, 1974.*]